United States Patent
Kono

(10) Patent No.: US 10,651,697 B2
(45) Date of Patent: May 12, 2020

(54) MAGNET FOR IPM ROTOR, IPM ROTOR, AND METHOD OF MANUFACTURING MAGNET FOR IPM ROTOR

(71) Applicant: HONDA MOTOR CO., LTD., Minato-ku, Tokyo (JP)

(72) Inventor: Michihisa Kono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 15/927,129

(22) Filed: Mar. 21, 2018

(65) Prior Publication Data

US 2018/0278104 A1 Sep. 27, 2018

(30) Foreign Application Priority Data

Mar. 27, 2017 (JP) ................ 2017-061238

(51) Int. Cl.
*H02K 1/27* (2006.01)
*H02K 15/03* (2006.01)
*H02K 1/02* (2006.01)

(52) U.S. Cl.
CPC ............ *H02K 1/2766* (2013.01); *H02K 1/02* (2013.01); *H02K 1/276* (2013.01); *H02K 15/03* (2013.01)

(58) Field of Classification Search
CPC .. H02K 1/00; H02K 1/02; H02K 1/22; H02K 1/24; H02K 1/27; H02K 1/276; H02K 1/2766; H02K 15/00; H02K 15/03; H02K 21/06; H02K 21/08; H02K 21/12; H02K 21/14; H02K 21/16
See application file for complete search history.

(56) References Cited

U.S. PATENT DOCUMENTS

2002/0121827 A1* 9/2002 Kaneko ................. H02K 1/276
310/156.43
2010/0007232 A1* 1/2010 Komuro ............... H02K 1/2766
310/156.01

FOREIGN PATENT DOCUMENTS

| JP | 60-226749 | 11/1985 |
|---|---|---|
| JP | 10-146031 | 5/1998 |
| JP | 11-332144 | 11/1999 |
| JP | 2002-034185 | 1/2002 |
| JP | 2002-044887 | 2/2002 |
| JP | 2011-508586 | 3/2011 |
| JP | 2012-186889 | 9/2012 |
| JP | 2016-163506 | 9/2016 |

OTHER PUBLICATIONS

Japanese Office Action for Japanese Patent Application No. 2017-061238 dated Jun. 4, 2019.
Japanese Office Action for Japanese Patent Application No. 2017-061238 dated Oct. 23, 2018.
Japanese Office Action for Japanese Patent Application No. 2017-061238 dated Dec. 24, 2019.

\* cited by examiner

*Primary Examiner* — Tran N Nguyen
(74) *Attorney, Agent, or Firm* — Amin, Turocy & Watson, LLP

(57) ABSTRACT

A magnet for an IPM rotor is inserted into a rotor core in an inserting direction along an axial direction thereof and buried in the rotor core in a circumferential direction thereof. The magnet for an IPM rotor is formed such that a shape thereof is a parallelogram having opposing sides when seen in a plan view from the inserting direction.

5 Claims, 6 Drawing Sheets

MAGNET FOR IPM ROTOR, IPM ROTOR, AND METHOD OF MANUFACTURING MAGNET FOR IPM ROTOR

CROSS-REFERENCE TO RELATED APPLICATION

Priority is claimed on Japanese Patent Application No. 2017-061238, filed Mar. 27, 2017, the content of which is incorporated herein by reference.

BACKGROUND OF THE INVENTION

Field of the Invention

The present invention relates to a magnet for an IPM rotor, an IPM rotor, and a method of manufacturing a magnet for an IPM rotor.

Description of Related Art

In a related art, an interior permanent magnet (IPM) rotor is known as a rotor used in a rotating electric machine. The IPM rotor is a rotor obtained by burying a magnet (a magnet for an IPM rotor) in a rotor core. The magnet for an IPM rotor is buried parallel to a circumferential direction of the rotor core (for example, see Japanese Unexamined Patent Application, First Publication No. 2002-44887 (hereinafter, Patent Literature 1)).

Incidentally, in order to improve magnetic efficiency of a rotating electric machine, it is generally necessary to dispose a magnet close to an outer circumferential surface of a rotor core.

SUMMARY OF THE INVENTION

However, the magnet for an IPM rotor of Patent Literature 1 is formed in a rectangular shape when seen in an inserting direction to the rotor core (an axial direction of the rotor core). For this reason, a distance between an outer surface of the magnet for an IPM rotor and an outer circumferential surface of the rotor is increased from the outside of the magnet toward a central section.

Accordingly, in the magnet in the related art, there is room for improvement in that magnetic efficiency is improved by disposing the magnet close to the outer circumferential surface of the rotor core such that the rotor core is efficiently rotated.

In consideration of the above-mentioned circumstances, an aspect according to the present invention is to provide a magnet for an IPM rotor, an IPM rotor, and a method of manufacturing a magnet for an IPM rotor that allow a rotor core to be efficiently rotated.

In order to solve the above-mentioned problems and accomplish the above-mentioned purposes, the present invention employs the following aspects.

(1) A magnet for an IPM rotor according to an aspect of the present invention is a magnet for an IPM rotor inserted into a rotor core in an inserting direction along an axial direction thereof and buried in the rotor core in a circumferential direction thereof, wherein the magnet is formed such that a shape thereof is a parallelogram having opposing sides when seen in a plan view from the inserting direction.

(2) In the magnet for an IPM rotor according to the aspect of (1), the magnet may be constituted by two split magnets formed by cutting one magnet having a rectangular shape when seen in the plan view along a diagonal line that diagonally connects opposite sides of the one magnet, and as the two split magnets are disposed such that the diagonal line becomes the opposing sides, the shape may be formed to be a parallelogram when seen in the plan view.

(3) In the magnet for an IPM rotor according to the aspect of (1) or (2), a magnetic orientation direction may be inclined with respect to the opposing sides of the magnet for an IPM rotor when seen in the plan view.

(4) In the magnet for an IPM rotor according to the aspect of one of (1) to (3), the magnet may be a rare earth magnet.

(5) A magnet for an IPM rotor according to an aspect of the present invention is a magnet for an IPM rotor inserted into a rotor core in an inserting direction along an axial direction thereof and buried in the rotor core in a circumferential direction thereof, wherein the magnet is formed such that a shape thereof is a trapezoidal shape when seen in a plan view from the inserting direction.

(6) An IPM rotor according to an aspect of the present invention includes the magnets for an IPM rotor according to the aspect of one of (1) to (5); and a plurality of slots formed in a circumferential direction of a rotor core and into which the magnets for an IPM rotor are inserted.

(7) A method of manufacturing a magnet for an IPM rotor according to an aspect of the present invention includes a splitting process of cutting a magnet having a rectangular shape when seen in a plan view along a diagonal line that diagonally connects opposite sides of the magnet and forming two split magnets; and a disposing process of disposing the two split magnets such that the diagonal line becomes opposing sides and forming the magnet for an IPM rotor according to the aspect of (1) such that a shape thereof is a parallelogram when seen in the plan view.

In the magnet for an IPM rotor of the aspect of (1), the magnet is formed such that the shape thereof is a parallelogram when seen in the plan view.

Accordingly, when a plurality of magnets for an IPM rotor are disposed along the outer circumferential side of the rotor core, the magnet is disposed at a position closer to the outer circumferential surface of the rotor core than in the case in which the magnet has a rectangular shape when seen in the plan view.

In addition, since the magnet for an IPM rotor has the parallelogram shape when seen in the plan view, an area of the outer surface in a radial direction is secured to be larger than in the case in which the magnet has a rectangular shape when seen in the plan view.

Accordingly, in the magnet for an IPM rotor of the aspect of (1), it is possible to improve magnetic efficiency and efficiently rotate the rotor core.

In the magnet for an IPM rotor according to the aspect of (2), as the two split magnets formed by diagonally cutting the magnet having a rectangular shape when seen in the plan view are disposed, the magnet is formed such that the shape thereof is a parallelogram shape when seen in the plan view.

For this reason, in the magnet for an IPM rotor according to the aspect of (2), the magnet for an IPM rotor having the parallelogram shape when seen in the plan view can be easily manufactured by machining the rectangular magnet, which can be easily manufactured.

Accordingly, manufacturing costs of the magnet for an IPM rotor according to the aspect of (2) can be minimized.

In the magnet for an IPM rotor according to the aspect of (3), the magnetic orientation direction is inclined with respect to the opposing sides of the magnet for an IPM rotor when seen in the plan view.

Accordingly, a magnetic flux passing through the magnet for an IPM rotor flows diagonally in the magnetic orientation direction. Accordingly, a magnetic force can be efficiently applied during rotation of the rotor core.

Accordingly, the magnet for an IPM rotor according to the aspect of (3) can more efficiently rotate the rotor core.

The magnet for an IPM rotor according to the aspect of (4) is a rare earth magnet.

Accordingly, in the magnet for an IPM rotor according to the aspect of (4), the magnetic force is increased in comparison with the case in which the magnet for an IPM rotor is not a rare earth magnet.

Accordingly, the magnet for an IPM rotor according to the aspect of (4) can more efficiently rotate the rotor core.

In the magnet for an IPM rotor according to the aspect of (5), the magnet is formed such that the shape thereof is a trapezoidal shape when seen from an end surface side of the rotor core. Accordingly, when a plurality of magnets for an IPM rotor are disposed along the outer circumferential side of the rotor core, the magnet is disposed at a position closer to the outer circumferential surface of the rotor core than in the case in which the magnet has a rectangular shape when seen in the plan view.

In addition, since the shape of the magnet for an IPM rotor is the trapezoidal shape when seen in the plan view, an area of the outer surface in the radial direction is secured to be larger than the case in which the magnet has a rectangular shape when seen in the plan view.

Accordingly, in the magnet for an IPM rotor according to the aspect of (5), it is possible to improve magnetic efficiency and efficiently rotate the rotor core.

The IPM rotor according to the aspect of (6) includes the above-mentioned magnet for an IPM rotor, and the plurality of slots formed in the circumferential direction of the rotor core and into which the magnets for an IPM rotor are inserted.

Accordingly, when the plurality of magnets for an IPM rotor are disposed along the outer circumferential side of the rotor core, the magnet is disposed at a position closer to the outer circumferential surface of the rotor core than in the case in which the magnet has a rectangular shape when seen in the plan view.

In addition, the area of the outer surface of the magnet for an IPM rotor in the radial direction is secured to be larger than in the case in which the magnet has a rectangular shape when seen in the plan view.

Accordingly, the IPM rotor according to the aspect of (6) can be efficiently rotated due to improved magnetic efficiency.

The method of manufacturing a magnet for an IPM rotor according to the aspect of (7) includes a splitting process of cutting the magnet along a diagonal line that diagonally connects opposite sides of the magnet having a rectangular shape when seen in the plan view and forming two split magnets; and a disposing process of disposing the two split magnets such that the diagonal line becomes the opposing sides and forming the magnet for an IPM rotor such that a shape thereof is a parallelogram when seen in the plan view.

For this reason, in the method of manufacturing a magnet for an IPM rotor according to the aspect of (7), the magnet for an IPM rotor having a parallelogram shape when seen in the plan view can be easily manufactured by processing the rectangular magnet that can be easily manufactured.

Accordingly, in the method of manufacturing a magnet for an IPM rotor of the aspect of (7), manufacturing costs can be minimized.

DETAILED DESCRIPTION OF THE INVENTION

Hereinafter, embodiments of the present invention will be described with reference to the accompanying drawings.

First Embodiment

Figure 1:
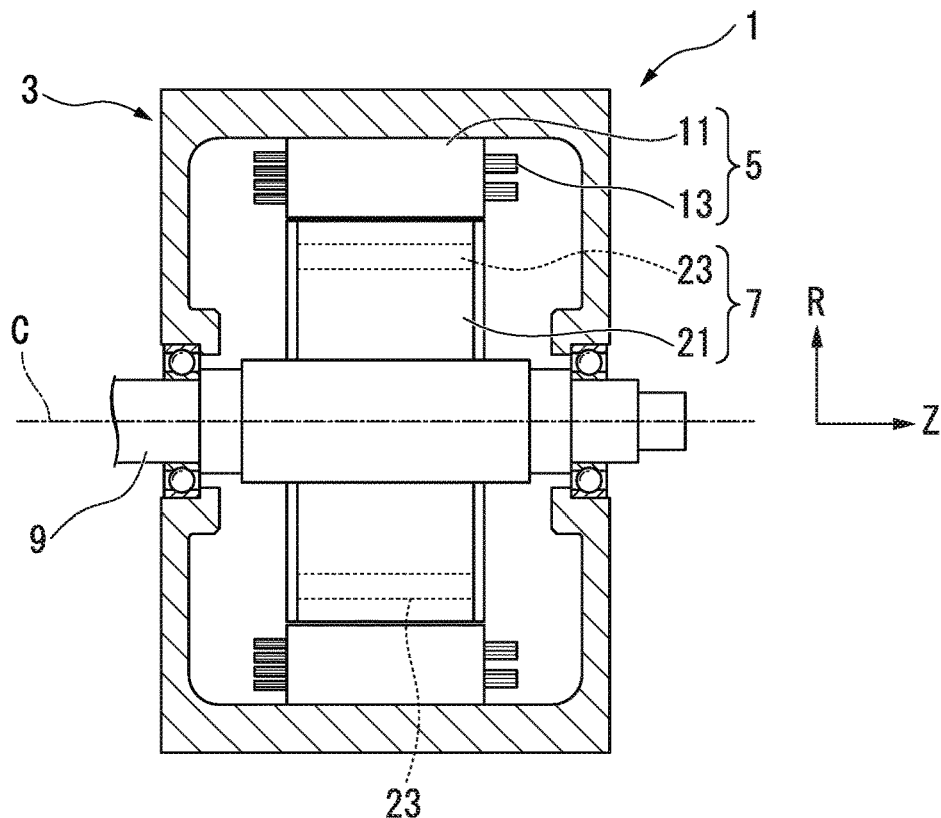
FIG. 1 is a cross-sectional view showing an entire configuration of a rotating electric machine including an IPM rotor of a first embodiment.

FIG. 1 is a cross-sectional view showing an entire configuration of a rotating electric machine including an IPM rotor of a first embodiment.

As shown in FIG. 1, a rotating electric machine 1 includes a case 3, a stator 5, an IPM rotor 7, and a shaft 9. The rotating electric machine 1 is a traveling motor mounted on a vehicle such as a hybrid automobile or an electric automobile. However, the configuration of the embodiment is not limited to the example and may also be applied to a motor for another purpose such as a generating motor or the like mounted on the vehicle. In addition, the configuration of the embodiment may be a rotating electric machine other than the one mounted on the vehicle and may also be applied to a so-called rotating electric machine including a generator as a whole.

The case 3 is formed in a tubular shape in which the stator 5 and the IPM rotor 7 are accommodated.

The stator 5 is formed in an annular shape. The stator 5 is attached to an inner circumferential surface of the case 3.

The stator 5 has a stator core 11, and a winding 13 attached to the stator core 11. The stator 5 generates a magnetic field as current flows through the winding 13.

The IPM rotor 7 is disposed inside the stator 5. The IPM rotor 7 is formed in an annular shape. The IPM rotor 7 has a rotor core 21, and a magnet 23 for an IPM rotor attached to the rotor core 21. The rotor core 21 is driven to be rotated as the magnetic field generated from the stator is repelled by or attracted to the magnet 23 for an IPM rotor.

The shaft 9 is connected to the IPM rotor 7. The shaft 9 outputs rotation of the IPM rotor 7 as a driving force.

Hereinafter, an axial direction Z, a radial direction R, and a circumferential direction θ (see FIG. 2) of the rotating electric machine 1 (the stator 5 and the IPM rotor 7) are defined. The axial direction Z of the rotating electric machine 1 is a direction along a rotational central axis C of the shaft 9. The radial direction R of the rotating electric machine 1 is a direction perpendicular to the rotational central axis C. The circumferential direction θ of the rotating electric machine 1 is a direction around the rotational central axis C.

Figure 2:
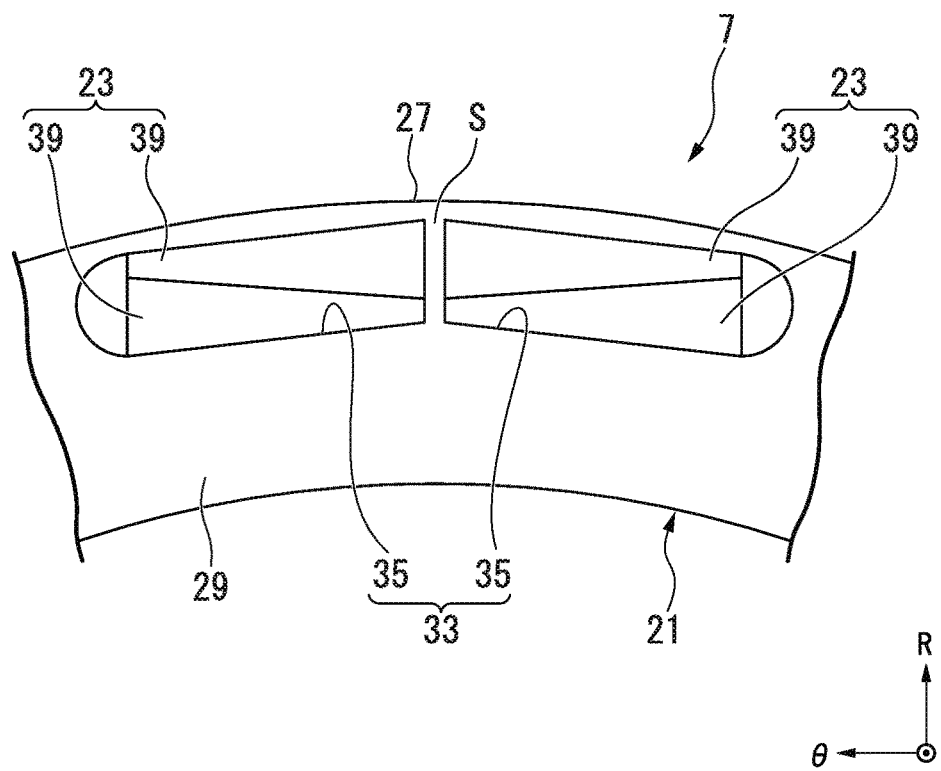
FIG. 2 is a plan view of part of an outer circumferential portion of the IPM rotor of the first embodiment when seen in an axial direction.

FIG. 2 is a plan view showing part of an outer circumferential portion of the IPM rotor of the first embodiment when seen in the axial direction.

As shown in FIG. 2, the IPM rotor 7 includes the rotor core 21 and the magnet 23 for an IPM rotor.

The rotor core 21 is formed in an annular shape. The rotor core 21 is formed by laminating a plurality of electromagnetic steel plates in the axial direction Z. A plurality of slot groups 33 are formed on the outer circumferential portion of the rotor core 21.

The plurality of slot groups 33 are formed in the circumferential direction θ. Each of the slot groups 33 is constituted by a pair of slots 35. The pair of slots 35 are formed to be slightly inclined along an outer circumferential surface 27 of the rotor core 21.

Each of the slots 35 is a through-hole passing through the rotor core 21 in the axial direction. The magnet 23 for an IPM rotor (to be described below) is inserted into each of the slots 35 in the axial direction Z. Each of the slots 35 is formed as a parallelogram when seen in a plan view from an end surface 29 side (i.e., the axial direction Z side) of the rotor core 21.

The magnets 23 for an IPM rotor are buried so as to be inserted into each of the slots 35 in an inserting direction along the axial direction Z. A center rib S is formed between the magnets 23 and 23 for an IPM rotor.

The magnet 23 for an IPM rotor is a rare earth magnet. A neodymium magnet, a samarium cobalt magnet, a praseodymium magnet, or the like is exemplified as the rare earth magnet.

The magnet 23 for an IPM rotor is formed such that a shape of the rotor core 21 seen in the inserting direction along the axial direction Z is a parallelogram when seen in the plan view.

Next, a method of manufacturing the magnet 23 for an IPM rotor will be described.

The magnet 23 for an IPM rotor is manufactured using a magnet 31 (see FIG. 3) having a rectangular shape when seen in a plan view. Further, the shape of the magnet 31 when seen in the plan view is a shape seen in the plan view in the inserting direction (i.e., the axial direction Z) when the magnet 31 is inserted into the rotor core 21, like the magnet 23 for an IPM rotor.

The method of manufacturing the magnet 23 for an IPM rotor includes a splitting process and a disposing process. Hereinafter, contents of the processes will be described.

(Splitting Process)

Figure 3:
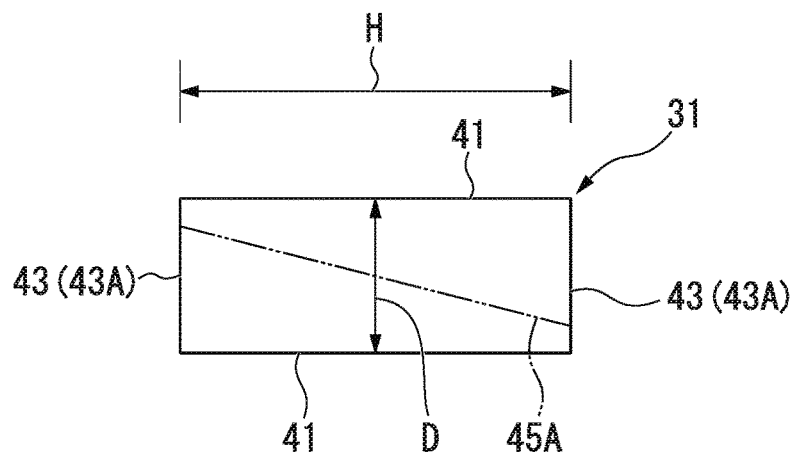
FIG. 3 is a view showing a splitting process of a method of manufacturing a magnet for an IPM rotor of the first embodiment.
Figure 4:
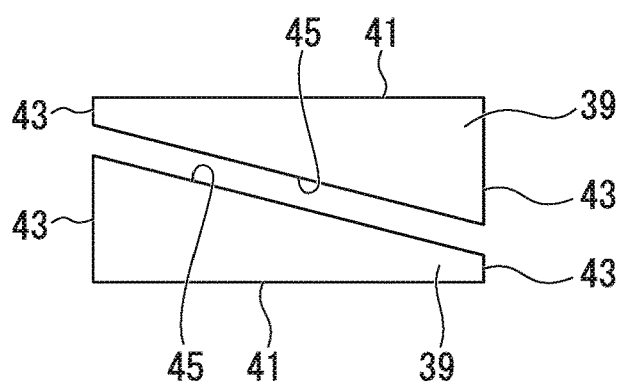
FIG. 4 is a view showing the splitting process of the method of manufacturing the magnet for an IPM rotor of the first embodiment.

FIG. 3 and FIG. 4 are views showing the splitting process of the method of manufacturing the magnet for an IPM rotor of the first embodiment.

In the method of manufacturing the magnet 23 for an IPM rotor, the splitting process is performed.

As shown in FIG. 3, in the splitting process, the magnet 31 formed in the rectangular shape when seen in the plan view is cut. Specifically, in the splitting process, two split magnets 39 are formed by cutting the magnet 31 along a diagonal line 45A that diagonally connects opposite sides 43A and 43A, which are a pair of short sides 43 of the magnet 31 when seen in the plan view. As shown in FIG. 4, a shape of each of the split magnets 39 is a trapezoidal shape when seen in the plan view.

(Disposing Process)

Figure 5:
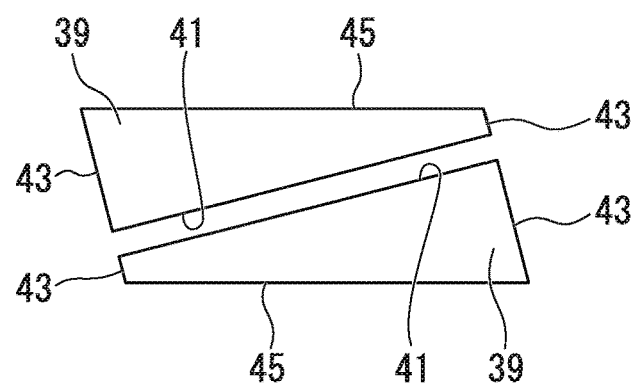
FIG. 5 is a view showing a disposing process of the method of manufacturing the magnet for an IPM rotor of the first embodiment.
Figure 6:
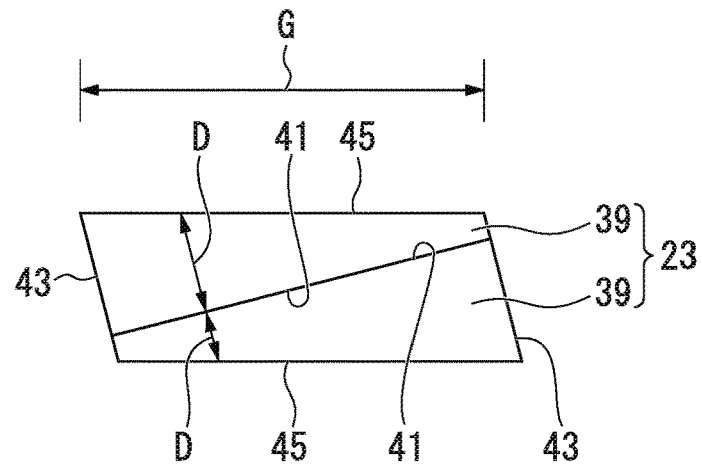
FIG. 6 is a view showing the disposing process of the method of manufacturing the magnet for an IPM rotor of the first embodiment.

FIG. 5 and FIG. 6 are views showing a disposing process of the method of manufacturing the magnet for an IPM rotor of the first embodiment.

Figure 7:
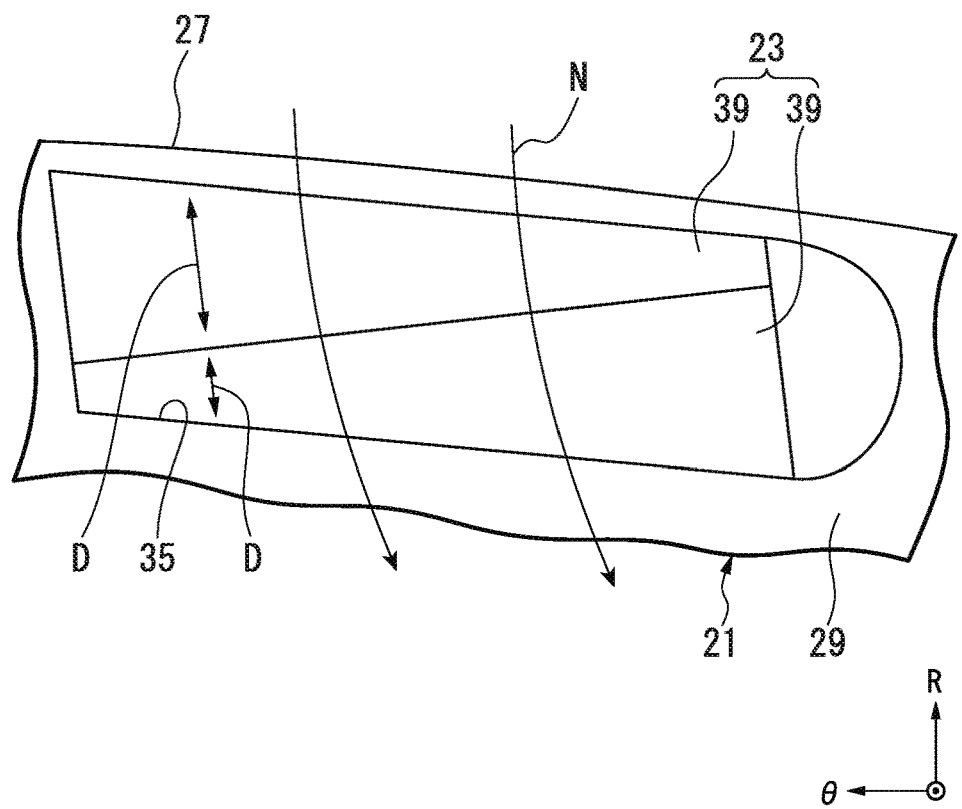
FIG. 7 is a view for describing a magnetic flux flowing through the magnet for an IPM rotor of the first embodiment.

FIG. 7 is a view for describing a magnetic flux flowing through the magnet for an IPM rotor of the first embodiment.

As shown in FIG. 5, in the disposing process, the two split magnets 39 are disposed. Specifically, in the disposing process, first, long sides 41 and 41 of the magnet 31 (see FIG. 3) are rotated 180° clockwise to face each other when seen in the plan view.

Next, one of the split magnets 39 and the other split magnet 39 are disposed close to each other by attaching them to each other using, for example, an adhesive agent or the like such that the long sides 41 and 41 of the split magnets 39 overlap when seen in the plan view, and thus, the magnet 23 for an IPM rotor is formed. Accordingly, as shown in FIG. 6, the magnet 23 for an IPM rotor has a parallelogram shape when seen in the plan view in the inserting direction.

Since sides of the magnet 23 for an IPM rotor corresponding to the diagonal line 45A of the split magnets 39 are opposing sides 45 and 45 of the magnet 23 for an IPM rotor, a length G of the opposing side 45 is larger than a length H (see FIG. 3) of the long side 41 of the magnet 31.

In addition, as the two split magnets 39 are disposed such that the shape thereof is a parallelogram shape when seen in the plan view from the inserting direction, a magnetic orientation direction D of the magnet 23 for an IPM rotor is inclined without being perpendicular to the opposing side 45. For this reason, as shown in FIG. 7, a magnetic flux N from the magnet 23 for an IPM rotor flows in the magnetic orientation direction D.

Next, an effect of the magnet 23 for an IPM rotor of the first embodiment will be described.

The magnet 23 for an IPM rotor of the first embodiment is formed such that the shape thereof is a parallelogram having the opposing sides 45 and 45 when seen in the plan view from the inserting direction.

According to the above-mentioned configuration, when the plurality of magnets 23 for an IPM rotor are disposed along an outer circumferential side of the rotor core 21, the magnet can be disposed at a position closer to the outer circumferential surface of the rotor core 21 than in the case in which the magnet has a rectangular shape when seen in the plan view. In addition, since the magnet 23 for an IPM rotor has a parallelogram shape when seen in the plan view, an area of an outer surface in the radial direction can be secured to be larger than in the case in which the magnet has a rectangular shape when seen in the plan view. Accordingly, in the magnet 23 for an IPM rotor of the first embodiment, it is possible to improve magnetic efficiency and efficiently rotate the rotor core 21.

In addition, the magnet 23 for an IPM rotor of the first embodiment is constituted by the two split magnets 39 formed by cutting the magnet 31 along the diagonal line 45A that diagonally connects the opposite sides 43A and 43A of the magnet 31 having a rectangular shape when seen in the plan view. In addition, the magnet 23 for an IPM rotor is formed to have a parallelogram shape when seen in the plan view as the two split magnets 39 are disposed such that the diagonal line 45A becomes the opposing sides 45.

According to the above-mentioned configuration, the magnet 23 for an IPM rotor having a parallelogram shape when seen in the plan view can be easily manufactured by machining the rectangular magnet 31, which can be easily manufactured. Accordingly, manufacturing costs of the magnet 23 for an IPM rotor of the first embodiment can be minimized.

In addition, in the magnet 23 for an IPM rotor of the first embodiment, the magnetic orientation direction D is inclined with respect to the opposing sides 45 of the magnet 23 for an IPM rotor when seen in the plan view.

According to the above-mentioned configuration, the magnetic flux N passing through the magnet 23 for an IPM rotor flows diagonally in the magnetic orientation direction D. Accordingly, a magnetic force can be efficiently applied during rotation of the rotor core 21. Accordingly, the magnet 23 for an IPM rotor of the first embodiment can more efficiently rotate the rotor core 21.

In addition, the magnet 23 for an IPM rotor of the first embodiment is a rare earth magnet.

According to the above-mentioned configuration, a magnetic force of the magnet 23 for an IPM rotor is increased in comparison to the case in which the magnet 23 for an IPM rotor is not a rare earth magnet. Accordingly, the magnet 23 for an IPM rotor of the first embodiment can more efficiently rotate the rotor core 21.

In addition, the IPM rotor 7 of the first embodiment includes the magnet 23 for an IPM rotor and a plurality of slots 35 formed in a circumferential direction of the rotor core 21 and into which the magnets 23 for an IPM rotor are inserted.

According to the above-mentioned configuration, when the plurality of magnets 23 for an IPM rotor are disposed along the outer circumferential side of the rotor core 21, the magnets can be disposed at positions closer to the outer circumferential surface of the rotor core 21 than in the case of the magnet having a rectangular shape when seen in the plan view. In addition, an area of the outer surface of the magnet 23 for an IPM rotor in the radial direction is secured to be larger than the case in which the magnet has a rectangular shape when seen in the plan view. Accordingly, the IPM rotor 7 of the first embodiment can be efficiently rotated due to magnetic efficiency being improved.

In addition, the method of manufacturing the magnet for an IPM rotor of the first embodiment includes a splitting process of cutting the magnet 31 along the diagonal line 45A that diagonally connects the opposite sides 43A and 43A of the magnet 31 having a rectangular shape when seen in the plan view and forming the two split magnets 39, and a disposing process disposing the two split magnets 39 such that the diagonal line 45A becomes the opposing sides 45 and 45 and forming the magnet 23 for an IPM rotor such that a shape thereof is a parallelogram when seen in the plan view.

According to the above-mentioned configuration, the magnet 23 for an IPM rotor having a parallelogram shape when seen in the plan view can be easily manufactured by machining the rectangular magnet 31, which can be easily manufactured. Accordingly, manufacturing costs of the magnet 23 for an IPM rotor disclosed in the first embodiment can be minimized.

Second Embodiment

Figure 8:
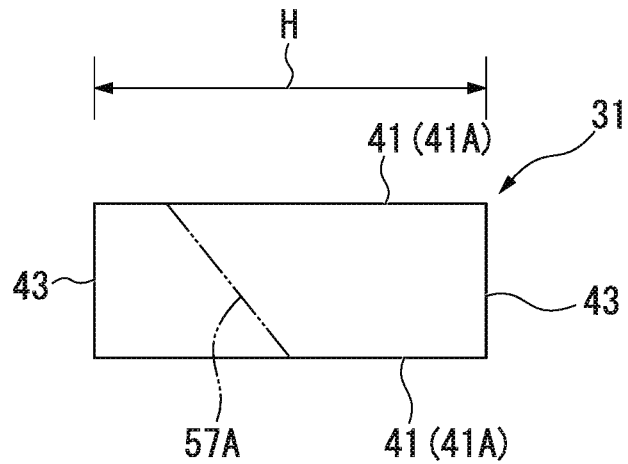
FIG. 8 is a view showing a splitting process of a method of manufacturing a magnet for an IPM rotor of a second embodiment.
Figure 9:
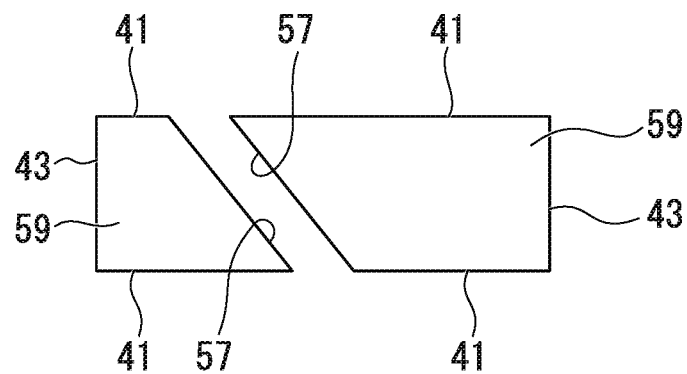
FIG. 9 is a view showing the splitting process of the method of manufacturing the magnet for an IPM rotor of the second embodiment.

FIG. 8 and FIG. 9 are views showing a splitting process of a method of manufacturing a magnet for an IPM rotor of a second embodiment.

Figure 10:
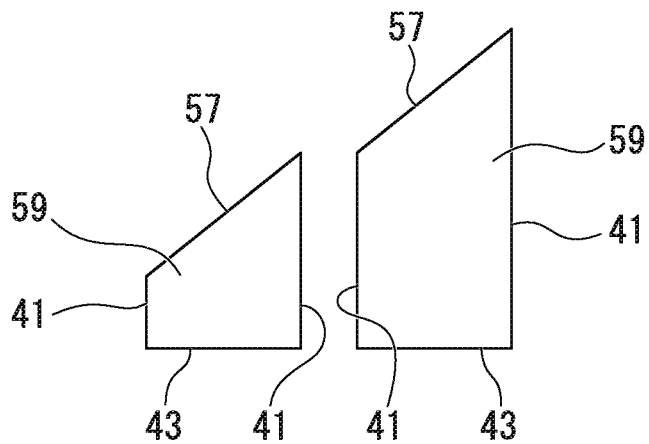
FIG. 10 is a view showing a disposing process of the method of manufacturing the magnet for an IPM rotor of the second embodiment.
Figure 11:
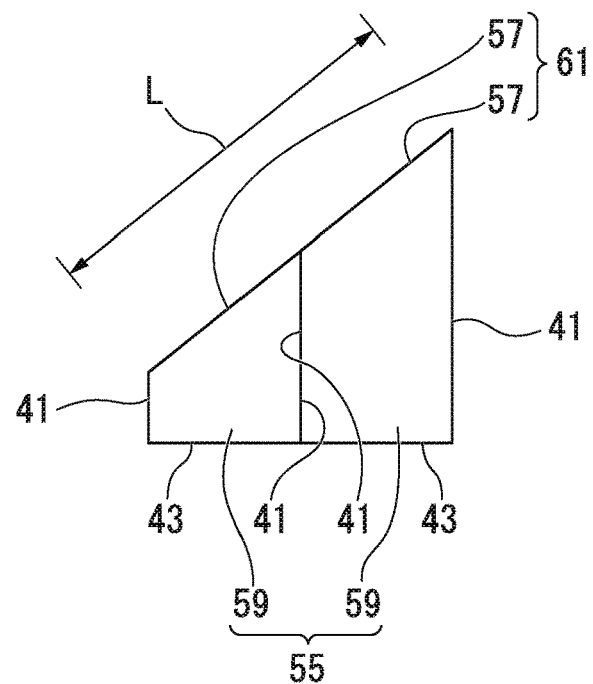
FIG. 11 is a view showing the disposing process of the method of manufacturing the magnet for an IPM rotor of the second embodiment.

FIG. 10 and FIG. 11 are views for describing a disposing process of the method of manufacturing the magnet for an IPM rotor of the second embodiment.

Hereinafter, a magnet 55 for an IPM rotor and a method of manufacturing the magnet 55 for an IPM rotor of the second embodiment will be described with reference to FIG. 8 to FIG. 11.

(Splitting Process)

In the method of manufacturing the magnet 55 for an IPM rotor of the second embodiment, the splitting process is performed.

As shown in FIG. 8 and FIG. 9, in the splitting process, the magnet 31 having a rectangular shape when seen in the plan view is cut. Specifically, in the splitting process, the magnet 31 is cut along a diagonal line 57A that diagonally connects opposite sides 41A and 41A that are the pair of long sides 41 of the magnet 31 when seen in the plan view, and two split magnets 59 are formed. As shown in FIG. 9, a shape of each of the split magnets 59 is a trapezoidal shape when seen in the plan view.

(Disposing Process)

As shown in FIG. 10, in the disposing process, the two split magnets 59 are disposed. Specifically, in the disposing process, first, one of the split magnets 59 having a small volume is rotated 90 degrees counterclockwise, and the other split magnet 59 having a large volume is rotated 90 degrees clockwise such that the long sides 41 and 41 of the magnet 31 (see FIG. 3) face each other when seen in the plan view.

Next, the one split magnet 59 and the other split magnet 59 are disposed close to each other to be adhered by, for example, an adhesive agent such that the long sides 41 and 41 of the split magnets 59 overlap when seen in the plan view, and the magnet 55 for an IPM rotor is formed. Accordingly, as shown in FIG. 11, the magnet 55 for an IPM rotor has a trapezoidal shape when seen in the plan view from the inserting direction.

A plurality of magnets 55 for an IPM rotor are buried in the circumferential direction of the rotor core 21, like the magnets 23 for an IPM rotor (see FIG. 6) of the first embodiment. An oblique side 61 of the magnet 55 for an IPM rotor is formed by coupling an oblique side 57 corresponding to the diagonal line 57A of each of the two split magnets 59. Accordingly, a length L of the oblique side 61 is larger than a length H (see FIG. 8) of the long side 41 of the rectangular magnet 31.

Next, an effect of the magnet 55 for an IPM rotor of the second embodiment will be described.

The magnet 55 for an IPM rotor of the second embodiment is a magnet for an IPM rotor inserted in the inserting direction along the axial direction Z of the rotor core 21 and buried in the circumferential direction θ of the rotor core 21 and is formed such that a shape thereof is a trapezoidal shape when seen in the plan view from the inserting direction.

According to the above-mentioned configuration, when the plurality of magnets 55 for an IPM rotor are disposed along the outer circumferential side of the rotor core 21, the magnet can be disposed at a position closer to the outer circumferential surface of the rotor core 21 than in the case in which the magnet has a rectangular shape when seen in the plan view. In addition, since the magnet 55 for an IPM rotor has a trapezoidal shape when seen in the plan view, an area of the outer surface in the radial direction is secured to be larger than in the case in which the magnet has a rectangular shape when seen in the plan view.

Accordingly, in the magnet 55 for an IPM rotor of the second embodiment, it is possible to improve magnetic efficiency and efficiently rotate the rotor core 21.

Further, the present invention is not limited to the above-mentioned embodiments described with reference to the accompanying drawings, and various variants may be considered without departing from the spirit of the present invention.

Figure 12:
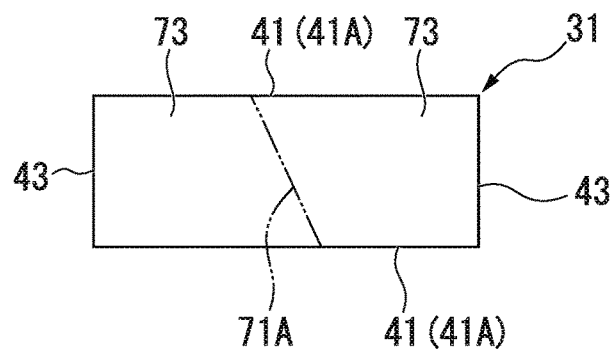
FIG. 12 is a view showing a method of manufacturing a magnet for an IPM rotor of another embodiment.
Figure 13:
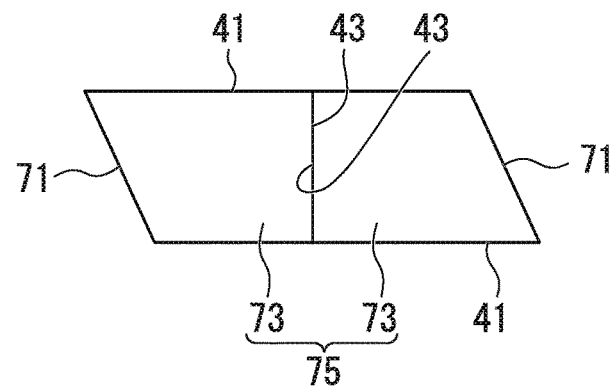
FIG. 13 is a view showing the method of manufacturing the magnet for an IPM rotor of the other embodiment.

FIG. 12 and FIG. 13 are views showing a method of manufacturing a magnet for an IPM rotor of another embodiment.

For example, in the first embodiment, the magnet is cut along the diagonal line 45A that diagonally connects the opposite sides 43A and 43A, which are the pair of short sides 43 of the magnet 31 when seen in the plan view, and is split into two to form the split magnets 39 (see FIG. 4).

On the other hand, as shown in FIG. 12, split magnets 73 may be formed by splitting the magnet into two along a diagonal line 71A that diagonally connects the opposite sides 41A and 41A, which are the long sides 41 of the magnet 31 when seen in the plan view.

In this case, as shown in FIG. 13, the two split magnets 73 are disposed to form a magnet 75 for an IPM rotor such that an oblique side formed by cutting the magnet 31 is an outer surface. Accordingly, since it is possible to form the magnet 75 for an IPM rotor having a parallelogram shape with opposing sides 71 and 71 when seen in the plan view, the same effect as that described in the first embodiment can be obtained.

Figure 14:
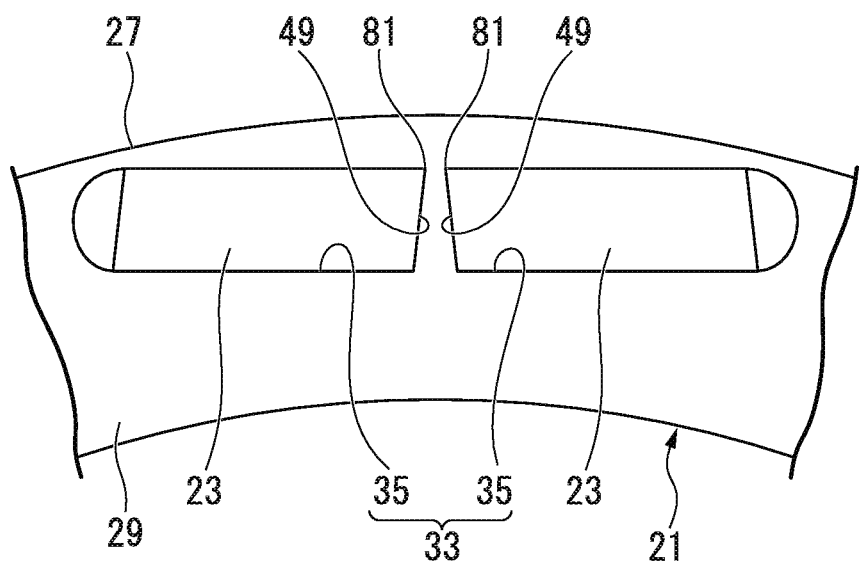
FIG. 14 is a plan view showing part of an outer circumferential portion of an IPM rotor of the other embodiment when seen in the axial direction.
Figure 15:
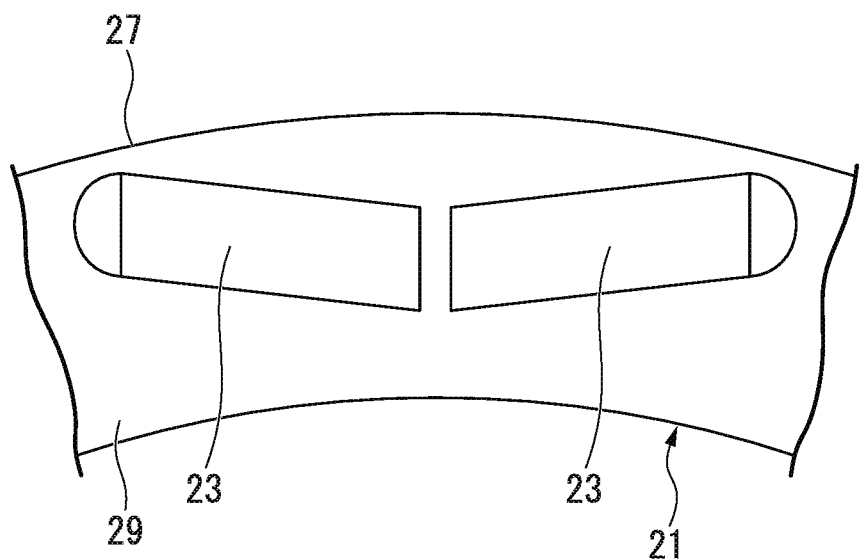
FIG. 15 is a plan view showing part of the outer circumferential portion of the IPM rotor of the other embodiment when seen in the axial direction.

FIG. 14 and FIG. 15 are plan views showing part of an outer circumferential portion of an IPM rotor of another embodiment seen from the axial direction.

In the first embodiment, the pair of magnets 23 and 23 for an IPM rotor are disposed along the outer circumferential surface 27 of the rotor core 21. On the other hand, as shown in FIG. 14, the pair of the magnets 23 and 23 for an IPM rotor may be disposed such that outer circumferential side ends 81 and 81 of opposing surfaces 49 and 49 are close to each other.

In addition, when the IPM rotor is a reluctance torque type IPM rotor, as shown in FIG. 15, the pair of the magnets 23 and 23 for an IPM rotor may be disposed in a V shape when seen in the plan view.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A magnet for an interior permanent magnet (IPM) rotor inserted into a rotor core in an inserting direction along an axial direction thereof and buried in the rotor core in a circumferential direction thereof,
   wherein the magnet is formed such that a shape thereof is a parallelogram having opposing sides when seen in a plan view from the inserting direction;
   wherein the magnet is constituted by two split magnets formed by cutting one magnet having a rectangular shape when seen in the plan view along a diagonal line that diagonally connects opposite sides of the one magnet, and
   as the two split magnets are disposed such that the diagonal line becomes the opposing sides, the shape is formed to be a parallelogram when seen in the plan view; and
   wherein
   there is provided with a plurality of slots formed in the circumferential direction of the rotor core and into which the two split magnets are inserted,
   each of the slots is formed such that a longitudinal direction thereof is along the circumferential direction of the rotor core,
   a center rib is formed between a pair of the slots which are next to each other in the circumferential direction of the rotor core, the center rib extending in a radial direction of the rotor core,
   the pair of the slots is formed in symmetrical shape about the center rib, and
   the diagonal lines of the two split magnets disposed at one side of the center rib and the diagonal lines of the two split magnets disposed at another side of the center rib are symmetrically disposed about the center rib.

2. The magnet for an IPM rotor according to claim 1, wherein a magnetic orientation direction is inclined with respect to the opposing sides of the magnet for an IPM rotor when seen in the plan view.

3. The magnet for an IPM rotor according to claim 1, wherein the magnet is a rare earth magnet.

4. An IPM rotor comprising:
   the magnets for an IPM rotor according to claim 1.

5. A method of manufacturing a magnet for an IPM rotor, the method comprising:
   a splitting process of cutting a magnet having a rectangular shape when seen in a plan view along a diagonal line that diagonally connects opposite sides of the magnet and forming two split magnets; and
   a disposing process of disposing the two split magnets such that the diagonal line becomes opposing sides and forming the magnet for an IPM rotor according to claim 1 such that a shape thereof is a parallelogram when seen in the plan view;
   wherein
   there is provided with a plurality of slots formed in the circumferential direction of the rotor core and into which the two split magnets are inserted,
   each of the slots is formed such that a longitudinal direction thereof is along the circumferential direction of the rotor core,
   a center rib is formed between a pair of the slots which are next to each other in the circumferential direction of the rotor core, the center rib extending in a radial direction of the rotor core,
   the pair of the slots is formed in symmetrical shape about the center rib, and
   the diagonal lines of the two split magnets disposed at one side of the center rib and the diagonal lines of the two split magnets disposed at another side of the center rib are symmetrically disposed about the center rib.

\* \* \* \* \*